United States Patent
Yamamoto et al.

(10) Patent No.: US 9,393,864 B2
(45) Date of Patent: Jul. 19, 2016

(54) FUELING PORTION STRUCTURE OF FUEL TANK

(75) Inventors: Satoshi Yamamoto, Nagoya (JP); Chiaki Kataoka, Nagakute (JP); Masaki Akagi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/345,014

(22) PCT Filed: Nov. 8, 2011

(86) PCT No.: PCT/JP2011/075747
§ 371 (c)(1),
(2), (4) Date: Mar. 14, 2014

(87) PCT Pub. No.: WO2013/069096
PCT Pub. Date: May 16, 2013

(65) Prior Publication Data
US 2014/0346171 A1    Nov. 27, 2014

(51) Int. Cl.
*B60K 15/00* (2006.01)
*B60K 15/04* (2006.01)

(52) U.S. Cl.
CPC .......... *B60K 15/04* (2013.01); *B60K 2015/0461* (2013.01)

(58) Field of Classification Search
CPC ............ B60K 15/0406; B60K 2015/0406; B60K 2015/0461; B60K 2015/0429
USPC ............... 220/86.2, 212.5, 304; 296/97.22
See application file for complete search history.

(56) References Cited

U.S. PATENT DOCUMENTS

| | | | |
|---|---|---|---|
| 3,580,414 A | 5/1971 | Ginsburgh et al. | |
| 4,765,547 A | 8/1988 | Marui et al. | |
| 4,881,655 A | 11/1989 | Jansky et al. | |
| 5,022,433 A | 6/1991 | Jansky et al. | |
| 5,884,958 A * | 3/1999 | Oddenino | 296/97.22 |
| 6,152,199 A | 11/2000 | Nusbaumer et al. | |
| 6,230,739 B1 | 5/2001 | Gericke | |
| 6,408,903 B1 * | 6/2002 | Theuer et al. | 141/348 |
| 7,883,137 B2 * | 2/2011 | Bar | 296/97.22 |
| 8,899,285 B2 * | 12/2014 | Hagano | 141/350 |
| 2004/0083779 A1 * | 5/2004 | Foltz | 70/159 |

(Continued)

FOREIGN PATENT DOCUMENTS

| | | |
|---|---|---|
| DE | 3602844 C1 | 1/1987 |
| DE | 3721049 A1 | 1/1989 |

(Continued)

*Primary Examiner* — Anthony Stashick
*Assistant Examiner* — Ernesto Grano
(74) *Attorney, Agent, or Firm* — Oliff PLC

(57) ABSTRACT

A fueling portion structure of a fuel tank can reliably close a fueling port, and at which pulling-out of a fueling gun from the fueling port is easier. A center of a rotation shaft and a contact position when valve is closed, that a spring for the flapper valve contacts when a flapper valve is at a closed-valve position, are connected, and a reference segment when the valve is closed is assumed. The center of the rotation shaft and a contact position when the valve is open, at a time when the flapper valve is at open-valve position HP, are connected, and a reference segment when the valve is open is assumed. A spring shaft is provided further toward the contact position when valve is closed side than a bisector of an angle formed by the reference segment when valve is closed and the reference segment when valve is open.

3 Claims, 15 Drawing Sheets

(56) References Cited

U.S. PATENT DOCUMENTS

| | | | |
|---|---|---|---|
| 2006/0289083 A1* | 12/2006 | Bar | 141/350 |
| 2007/0018131 A1* | 1/2007 | Bar | 251/213 |
| 2010/0012223 A1* | 1/2010 | Yoshida | 141/350 |
| 2010/0012224 A1* | 1/2010 | Yoshida | 141/350 |
| 2010/0072774 A1* | 3/2010 | Bar | 296/97.22 |
| 2010/0126625 A1* | 5/2010 | Berghorst et al. | 141/348 |
| 2012/0217240 A1* | 8/2012 | Dutzi et al. | 220/86.2 |
| 2013/0075395 A1* | 3/2013 | Hagano | 220/86.2 |
| 2013/0213963 A1* | 8/2013 | Chretien et al. | 220/86.2 |

FOREIGN PATENT DOCUMENTS

| | | |
|---|---|---|
| EP | 0153677 A1 | 9/1985 |
| JP | A-8-142694 | 6/1996 |

\* cited by examiner

FUELING PORTION STRUCTURE OF FUEL TANK

TECHNICAL FIELD

The present invention relates to a fueling portion structure of a fuel tank.

BACKGROUND ART

As a fueling portion structure for fueling a fuel tank of an automobile or the like, there is a structure in which the fueling port, into which a fueling nozzle is inserted, can be opened and closed by an opening/closing valve such as a flapper valve or the like. For example, in Japanese Patent Application Laid-Open No. 8-142694 (Patent Document 1), there is disclosed a structure provided with a valve body that is supported so as to rotate freely at the fuel flow-in port. This valve body is urged in the valve-closing direction by a spring. Further, due to a fueling gun being inserted into the fueling port, the valve body is rotated in the opening direction against the urging force of the spring.

However, in the structure of the aforementioned publication, the urging force of the spring becomes greater as the valve body rotates in the opening direction. In particular, the valve body, that has moved to the open-valve position, presses against the fueling gun with a large urging force. Therefore, the resistance when the fueling gun is pulled out is large.

Among fueling guns, there are those that are structured to have a local large-diameter portion, due to a coil spring being wound on the outer periphery of the distal end portion, or the like. With such a fueling gun, there are cases in which the large-diameter portion strongly catches on the housing of the fueling port (the fueling port member), and pulling-out becomes more difficult.

DISCLOSURE OF INVENTION

Technical Problem

In view of the above-described circumstances, a topic of the present invention is to obtain a fueling portion structure of a fuel tank that can reliably close a fueling port, and at which pulling-out of a fueling gun from the fueling port is made easy.

Solution to Problem

A first aspect of the present invention comprises: a fueling port member having a fueling port into which a fueling gun for fueling a fuel tank is inserted; an opening/closing valve that can open and close the fueling port; a rotation shaft for mounting, to the fueling port member, the opening/closing valve rotatably between a closed-valve position, at which the opening/closing valve closes the fueling port, and an open-valve position, at which the opening/closing valve is pushed by the fueling gun and opens the fueling port; and a spring member that is mounted to the fueling port member and slidably contacts the opening/closing valve and urges the opening/closing valve toward the closed-valve position, the position at which the spring member is mounted to the fueling port member being set further toward a contact position when valve is closed side than a bisector of an angle that is formed by a reference segment when valve is closed, that connects the rotation shaft and the contact position when valve is closed at which the spring member contacts the opening/closing valve at the closed-valve position, and a reference segment when valve is open, that connects the rotation shaft and a contact position when valve is open at which the spring member contacts the opening/closing valve at the open-valve position.

In the fueling portion structure of a fuel tank of the first aspect, the opening/closing valve is rotatably mounted to the fueling port member by the rotation shaft. The spring member that is mounted to the fueling port member urges the opening/closing valve toward the closed-valve position. In a state in which the fueling port is closed by the opening/closing valve, the closed-valve position can be maintained due to this urging force. When the fueling gun is inserted into the fueling port, the opening/closing valve is pushed by the fueling gun and rotates to the open-valve position against the urging force of the spring member, and the fueling port is opened.

The spring member slidably contacts the opening/closing valve. Here, there is assumed a reference segment when valve is closed that connects the rotation shaft of the opening/closing valve and the contact position when valve is closed, at which the spring member contacts the opening/closing valve at the closed-valve position. Moreover, there is assumed a reference segment when valve is open that connects the rotation shaft of the opening/closing valve and the contact position when valve is open, at which the spring member contacts the opening/closing valve at the open-valve position. Further, the mounting position to the fueling port member is set to be further toward the contact position when valve is closed side than a bisector of an angle formed by the reference segment when valve is closed and the reference segment when valve is open. Therefore, the length to the contact position when valve is closed is shorter than the length from the position, at which the spring member is mounted to the fueling port member, to the contact position when valve is open. In other words, the substantial length of the spring member (the length from the position of mounting to the fueling port member to the position of contacting the opening/closing valve) is longer at the time when the valve is open than at the time when the valve is closed. Accordingly, as compared with a structure in which the length of the spring member does not change between the time when the opening/closing valve is open and the time when the opening/closing valve is closed, the force in the valve-closing direction, that is applied to the opening/closing valve from the spring member when the opening/closing valve is at the open-valve position, is small. Due thereto, the force of pushing the fueling gun that is inserted in the fueling port also is low, and pulling-out of the fueling gun from the fueling port is easy. For example, even if a large diameter portion is structured by a spring or the like at the outer periphery of the fueling gun, catching of the large diameter portion on the fueling port member can be reduced, and pulling-out of the fueling gun is easy.

The first aspect may be structured such that the fueling port member has a spring shaft that is formed parallel to the rotation shaft and at a different position than the rotation shaft, and the spring member is a torsion spring having a mounting portion that is wound around and mounted to the spring shaft, and a sliding contact portion that extends from the mounting portion and slidably contacts the opening/closing valve.

In this structure, the mounting portion of the spring member is wound around and mounted to the spring shaft. Further, the sliding contact portion, that extends from the mounting portion, slidably contacts the opening/closing valve. Because the spring member is made to be a torsion spring, even if the spring member deforms in accordance with the angle of opening of the opening/closing valve, the change in the spring force thereof is small.

Moreover, there may be a structure having a supporting member that is provided at the opening/closing valve and that contacts and slidably supports the sliding contact portion of the spring member.

By providing such a supporting member and supporting the sliding contact portion of the spring member, the state in which the spring member and the opening/closing valve slidably contact one another can be maintained more reliably as compared with a structure that is not provided with the supporting member.

A second aspect of the present invention comprises: a fueling port member having a fueling port into which a fueling gun for fueling a fuel tank is inserted; an opening/closing valve that can open and close the fueling port; a rotation shaft for mounting, to the fueling port member, the opening/closing valve rotatably between a closed-valve position, at which the opening/closing valve closes the fueling port, and an open-valve position, at which the opening/closing valve is pushed by the fueling gun and opens the fueling port; and a spring member that is mounted to the fueling port member and contacts the opening/closing valve and urges the opening/closing valve toward the closed-valve position, the posture of the spring member changing such that a valve-closing direction component of urging force, that the spring member applies to the opening/closing valve that is at the open-valve position, is smaller than a valve-closing direction component of urging force that the spring member applies to the opening/closing valve that is at the closed-valve position.

In the fueling portion structure of a fuel tank of the second aspect, the opening/closing valve is rotatably mounted to the fueling port member by the rotation shaft. The spring member that is mounted to the fueling port member urges the opening/closing valve in the valve-closing direction. In the state in which the fueling port is closed by the opening/closing valve, the closed-valve position can be maintained due to this urging force. When the fueling gun is inserted into the fueling port, the opening/closing valve is pushed by the fueling gun and rotates to the open-valve position against the urging force by the spring member, and the fueling port is opened.

The posture of the spring member changes such that a valve-closing direction component of the urging force, that the spring member applies to the opening/closing valve that is at the open-valve position, is smaller than a valve-closing direction component of the urging force, that the spring member applies to the opening/closing valve that is at the closed-valve position. Accordingly, as compared with a structure in which the spring member does not change posture in such a way, the force in the valve-closing direction, that is applied to the opening/closing valve from the spring member when the opening/closing valve is at the closed-valve position, is small. Due thereto, the force of pushing the fueling gun that is inserted in the fueling port also is low, and pulling-out of the fueling gun from the fueling port is easy. For example, even if a large diameter portion is structured by a spring or the like at the outer periphery of the fueling gun, catching of the large diameter portion on the fueling port member can be reduced, and pulling-out of the fueling gun is easy.

In the second aspect, the spring member may be made to have: a first anchor portion that is anchored on the fueling port member; a second anchor portion that is anchored on the opening/closing valve; and a bent portion that is formed by being bent between the first anchor portion and the second anchor portion, and whose position and bending angle can change in order to give rise to the change in posture.

In this structure, the spring member is anchored on the interior of the fueling port member at the first anchor portion, and is anchored on the opening/closing valve at the second anchor portion. Due thereto, the posture of the spring member is maintained, and the spring member can be made to apply urging force toward the closed-valve position to the opening/closing valve.

Further, the first anchor portion is provided at the interior of the fueling port member. Accordingly, the fueling portion structure of a fuel tank can be made to be compact, as compared with a structure in which the first anchor portion is provided at the exterior of the fueling port member.

Because the second anchor portion is anchored on the opening/closing valve and does not slide with respect to the opening/closing valve, the durability is high.

Further, due to the simple structure of changing the bending angle of the bent portion, the force in the valve-closing direction, that is applied to the opening/closing valve from the spring member when the opening/closing valve is at the closed-valve position, can be made to be small.

Advantageous Effects of Invention

Because the present invention has the above-described structure, there is obtained a fueling portion structure of a fuel tank that can reliably close a fueling port, and at which pulling-out of a fueling gun from the fueling port is made easy.

BEST MODES FOR CARRYING OUT THE INVENTION

Figure 1:
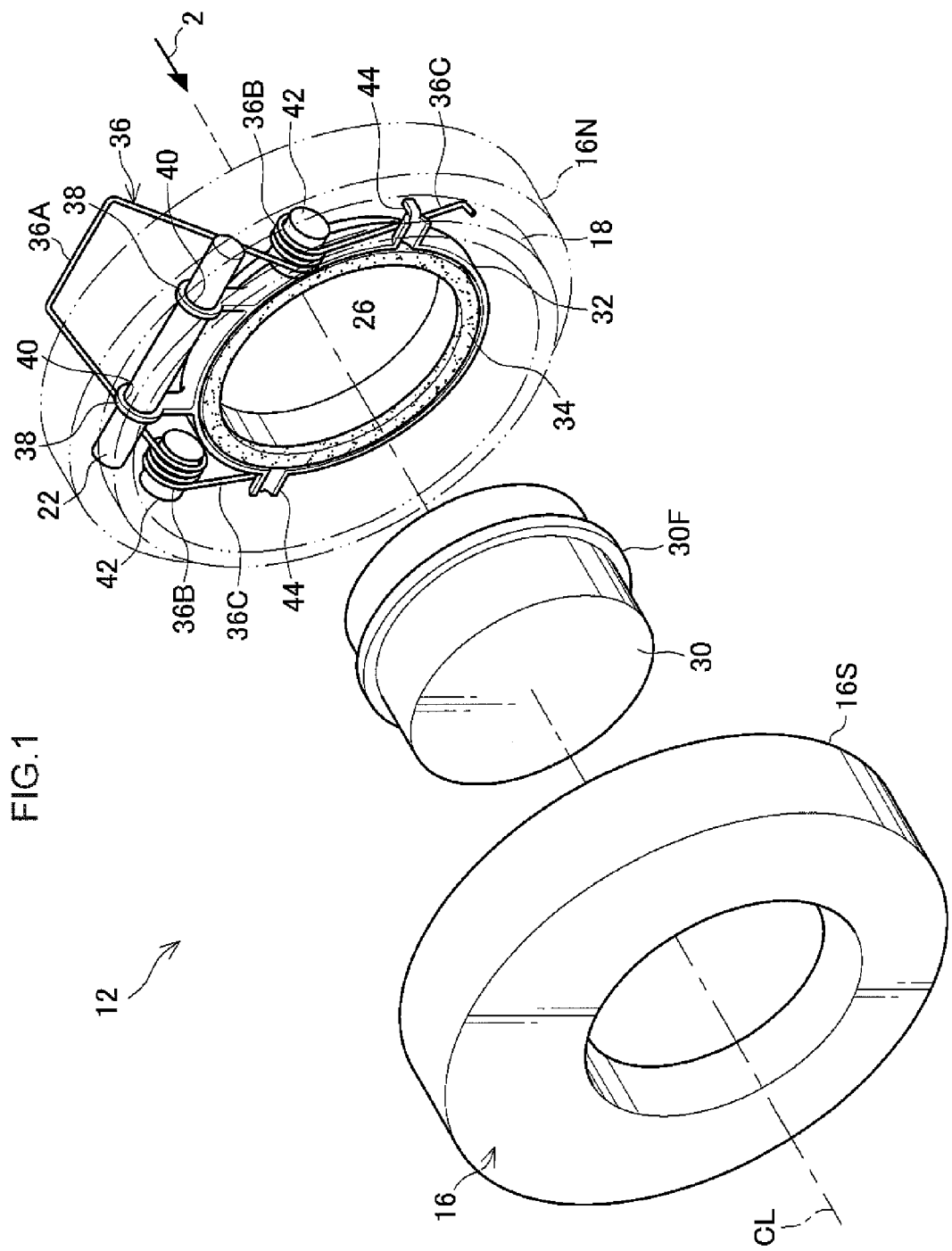
FIG. 1 is a schematic perspective view showing a fueling portion structure of a fuel tank of a first embodiment of the present invention.
Figure 2:
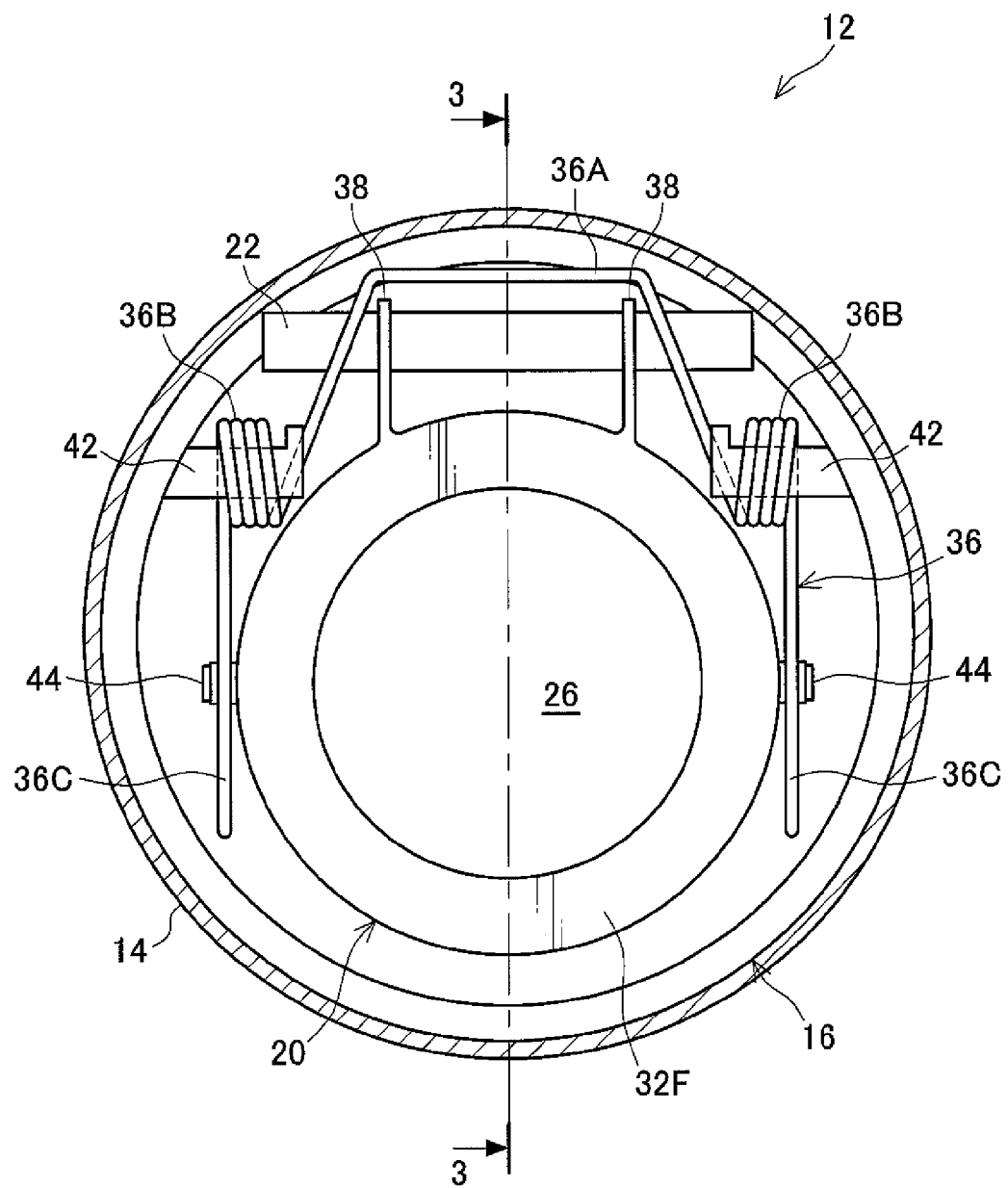
FIG. 2 is a rear view showing the fueling portion structure of a fuel tank of the first embodiment of the present invention, in a state of being viewed from the deep side of a fueling port.
Figure 3:
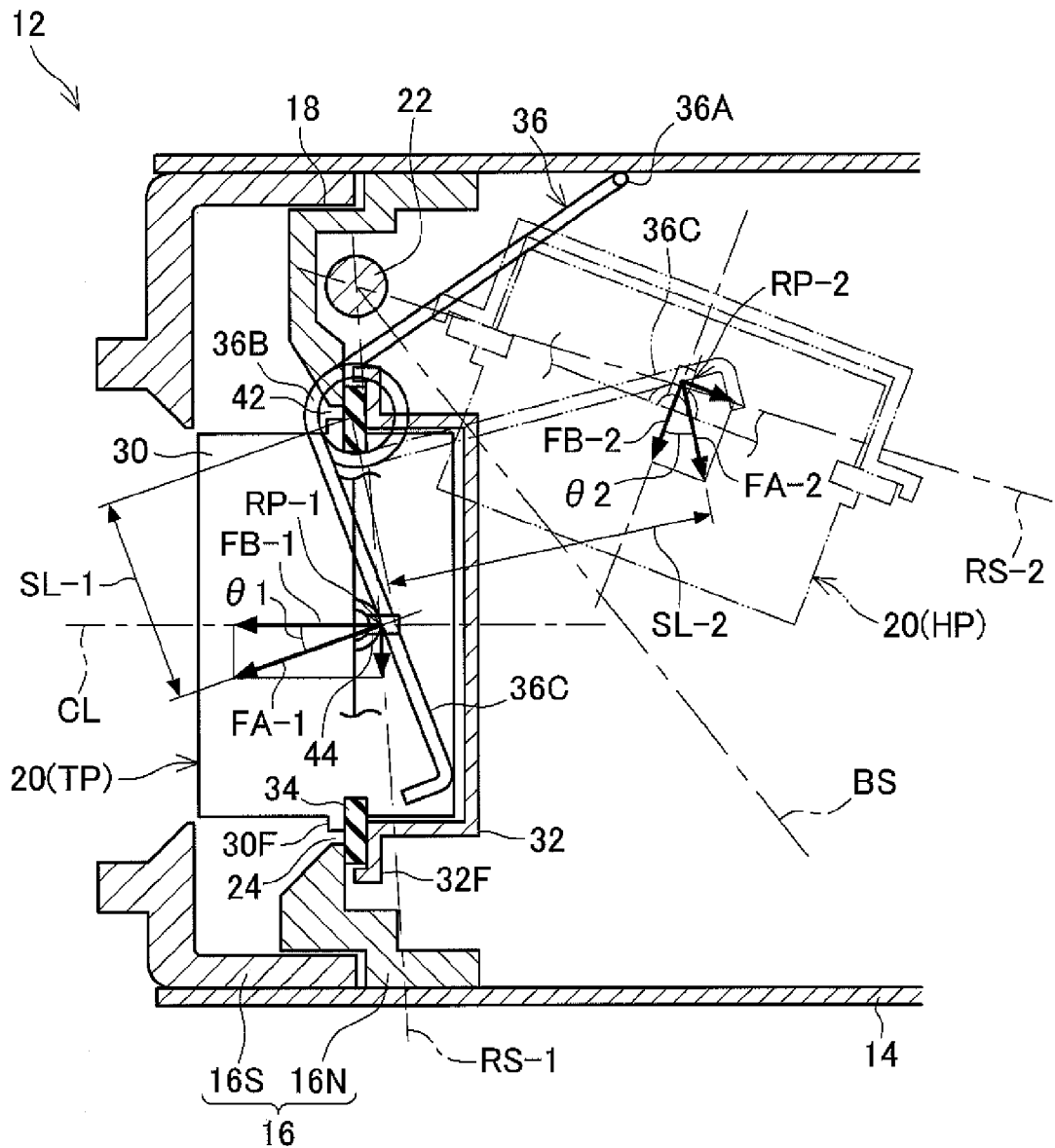
FIG. 3 is a cross-sectional view along line 3-3 of FIG. 2 showing the fueling portion structure of a fuel tank of the first embodiment of the present invention.

The external shape of a fueling portion structure of a fuel tank (hereinafter simply called "fueling portion structure") 12 of a first embodiment of the present invention is shown in FIG. 1 in an exploded perspective view. This fueling portion structure 12 is shown in FIG. 2 in a state of being viewed from the rear surface. Moreover, the fueling portion structure 12 is shown in FIG. 3 in a cross-sectional view along line 3-3 of FIG. 2. In the present embodiment, there is a structure in which a cap for closing a fueling port is not needed (a so-called capless structure).

Figure 4:
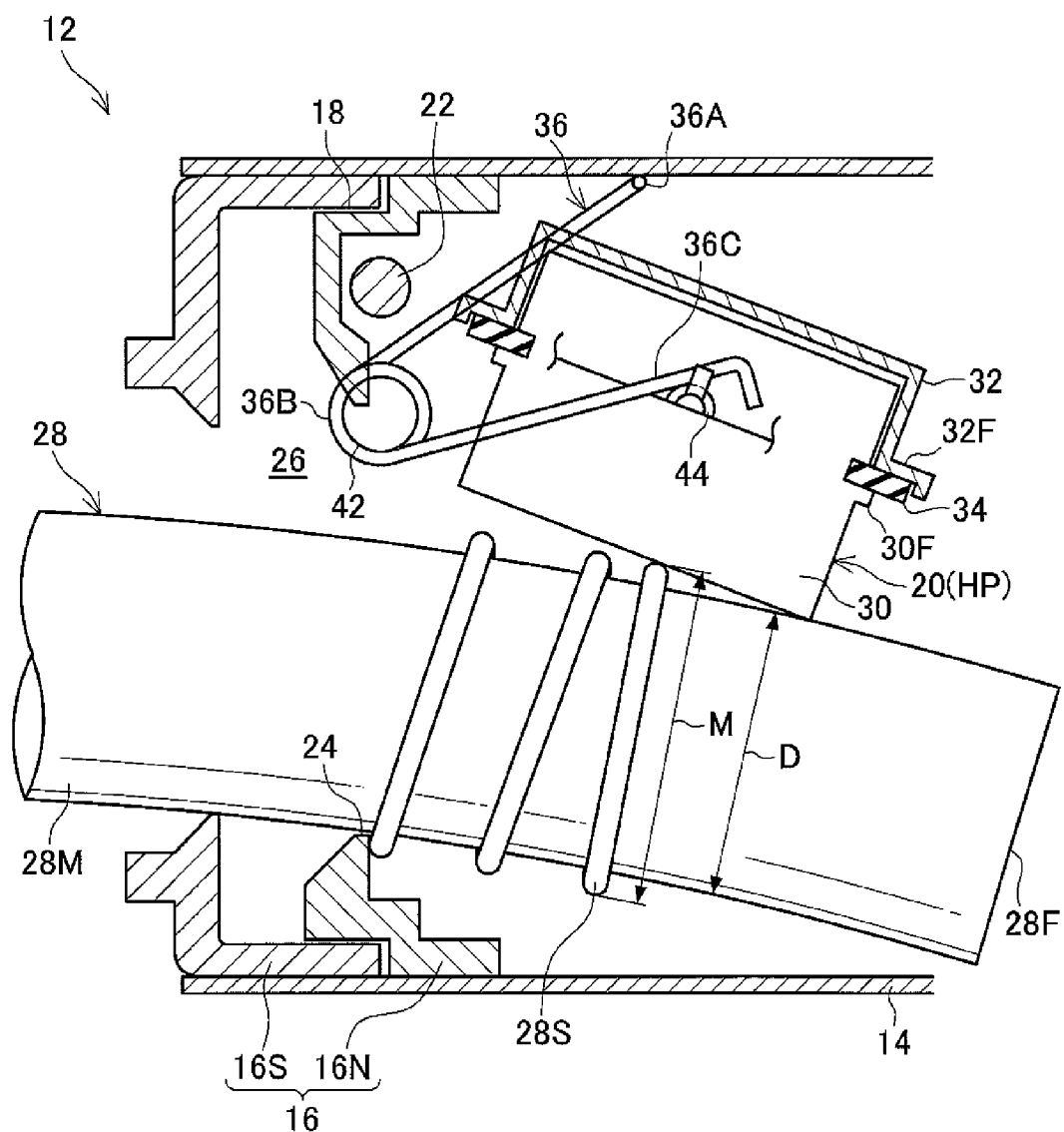
FIG. 4 is a cross-sectional view showing a state in which a fueling gun is inserted into the fueling portion structure of a fuel tank of the first embodiment of the present invention.

Further, in the present embodiment, as shown in FIG. 4, a structure in which a fueling gun main body 28M that is cylindrical tube shaped, and a fueling gun spring 28S that is coil shaped is wound around the outer periphery of this fueling gun main body 28M, is assumed as a fueling gun 28 for fueling the fuel tank. The fueling gun spring 28S is wound at a position that is a predetermined distance apart from a distal end 28F of the fueling gun main body 28M. An outer diameter M of the fueling gun spring 28S portion is larger than an outer diameter D of the fueling gun main body 28M. Namely, midway along the longitudinal direction, the fueling gun 28 has a larger-diameter portion that is due to the fueling gun spring 28S.

The lower end of an inlet pipe 14 for fueling is connected to an unillustrated fuel tank. The fueling portion structure 12 is applied to the upper portion of this inlet pipe 14.

A housing member 16 that is substantially cylindrical tube shaped is mounted to the inner side of the upper end of the inlet pipe 14. In the present embodiment, in particular, the housing member 16 is made to be a structure having an inner housing 16N that is at the side near the fuel tank (the side that is near to the lower end of the inlet pipe 14), and an outer housing 16S that is positioned at the side that is further from the fuel tank than this inner housing 16N (the side nearer to the person carrying out fueling).

A small-diameter portion 18, at which the outer diameter of the inner housing 16N is made to be small, is formed at the inner housing 16N at a position near the outer housing 16S. The outer housing 16S is mounted to this small diameter portion 18, and the inner housing 16N and the outer housing 16S are made integral.

The housing member 16 is an example of the fueling port member of the present invention, and the interior of the housing member 16 is a fueling port 26. The fueling gun 28 is inserted into the fueling port 26, and the fuel tank can be fueled. In the drawings, the center of the fueling port 26 is shown by center line CL.

Note that, hereinafter, when simply "the deep side" is used, it means the side that is near to the fuel tank at the housing member 16 (the right side in FIG. 3), and, when "the near side" is used, it means the side opposite thereto, i.e., the side into which the fueling gun 28 is inserted (the left side in FIG. 3). Further, when "radial direction" is used, it means the radial direction of the housing member 16 that is substantially cylindrical tube shaped.

An anchor portion 24 is provided at the inner housing 16N of the housing member 16, at a position that is beneath the fueling port 26 in FIG. 3 and FIG. 4. The anchor portion 24 gives rise to an appropriate degree of passage resistance at the time when the fueling gun spring 28S passes by.

Moreover, after the fueling gun spring 28S has passed by the anchor portion 24, as shown in FIG. 4, the anchor portion 24 anchors the fueling gun spring 28S, and suppresses inadvertent coming-out of the fueling gun 28 from the housing member 16.

A rotation shaft 22 is provided at the inner side of the upper portion of the inner housing 16N. The rotation shaft 22 is rotatably mounted to the housing member 16. Further, a flapper valve 20 rotates between a closed-valve position TP (the position shown by the solid lines in FIG. 3) at which the flapper valve 20 closes the fueling port 26, and an open-valve position HP (the position shown by the two-dot chain lines in FIG. 3 and shown by the solid lines in FIG. 4) at which the flapper valve 20 opens the fueling port 26.

At the open-valve position HP, the lower portion of the flapper valve 20, i.e., the side opposite the side at which the rotation shaft 22 is disposed, is moved greatly to the fuel tank side. At the closed-valve position TP, as can be understood from FIG. 2, the flapper valve 20 abuts the anchor portion 24, and rotating of the flapper valve 20 in the direction toward the closed-valve position TP is restricted.

The flapper valve 20 has a valve main body portion 30 that is substantially cylindrical tube shaped or substantially solid cylindrical and that has a smaller diameter than the fueling port 26. A flange portion 30F that is annular is formed from the outer periphery of the valve main body portion 30. Further, a valve bracket 32 that is cylindrical tube shaped is mounted to the valve main body portion 30 from the side that is further toward the deep side than the flange portion 30F.

As shown in detail in FIG. 3 and FIG. 4, a flange portion 32F, that faces the flange portion 30F with an interval therebetween, is formed also at the valve bracket 32. Further, a sealing rubber 34 that is annular is mounted between the flange portions 30F, 32F. When the flapper valve 20 is at the closed-valve position TP, the sealing rubber 34 fits tightly to the fueling port 26 of the inner housing 16N from the deep side. Due thereto, the state in which the fueling port 26 is closed can be reliably maintained.

As shown in FIG. 1 and FIG. 2, two corner pieces 38 project-out from the valve bracket 32. An insertion hole 40 is formed in the distal end of each of the corner pieces 38. Due to the rotation shaft 22 being inserted into the insertion holes 40, the flapper valve 20 is supported so as to be able to rotate around the rotation shaft 22.

Note that a valve for adjusting the pressure of the fuel tank interior, and the like, are provided as needed at the flapper valve 20.

As shown in FIG. 1 and FIG. 2, a pair of spring shafts 42 are provided at the inner housing 16N. In the present embodiment, in particular, the spring shafts 42 are positioned further toward the rotation shaft 22 side than the central line CL in the cross-section shown in FIG. 3.

The spring shafts 42 are substantially parallel to the rotation shaft 22, and are disposed differently than the rotation shaft 22. A spring 36 for the flapper valve (see FIG. 3) is wound around the spring shafts 42.

As shown in detail in FIG. 3 and FIG. 4, the spring 36 for the flapper valve has an anchor portion 36A that is anchored by an unillustrated anchoring member at the inner peripheral surface of the inlet pipe 14. Further, mounting portions 36B, that continue from the anchor portion 36A and are annular or spiral and are wound around and supported at the spring shafts 42, are formed at the spring 36 for the flapper valve. Moreover, the spring 36 for the flapper valve has sliding contact portions 36C that extend from the mounting portions 36B and slidably contact the flapper valve 20 at the extended portions. Due to the spring 36 for the flapper valve being formed in such a shape, the spring 36 for the flapper valve is a torsion spring that applies spring force from the sliding contact portions 36C to the flapper valve 20 due to the twisting of the mounting portions 36B.

Due to the spring 36 for the flapper valve contacting the flapper valve 20 at the sliding contact portions 36C, the spring 36 for the flapper valve urges the flapper valve 20 toward the closed-valve position TP (in the arrow R1 direction). In particular, when the flapper valve 20 is at the closed-valve position TP, the sealing rubber 34 is fit tightly to the inner housing 16N, and therefore, the fueling port 26 is not opened inadvertently. At the closed-valve position TP, when the flapper valve 20 is pushed by the fueling gun 28 that is about to be inserted in from the fueling port 26, the flapper valve 20 moves (rotates) toward the open-valve position HP against the urging force of the spring 36 for the flapper valve.

Figure 5:
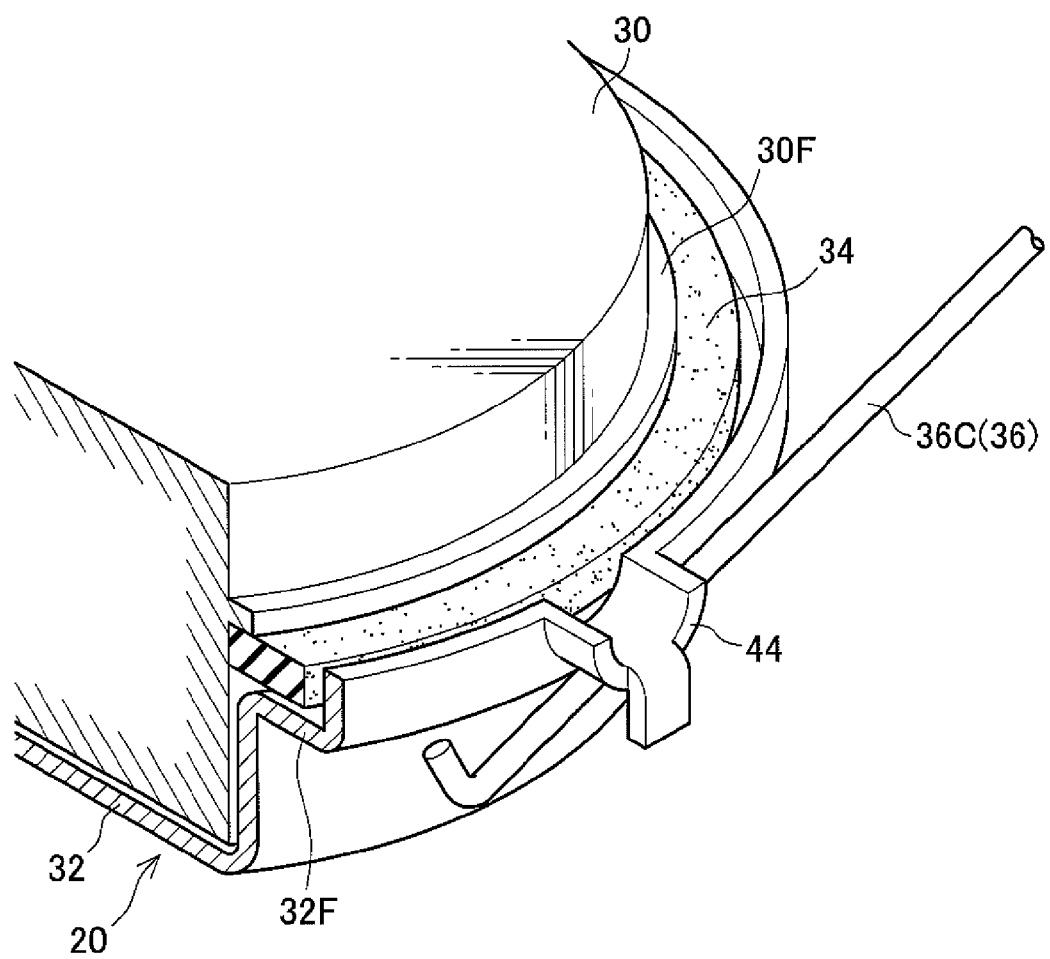
FIG. 5 is an enlarged perspective view partially showing, in a partially broken manner, the fueling portion structure of a fuel tank of the first embodiment of the present invention.

As shown in detail in FIG. 5 as well, a pair of sliding support pieces 44 are formed at the valve bracket 32 of the flapper valve 20, so as to be directed toward the radial direction outer side. The sliding support pieces 44 respectively correspond to the sliding contact portions 36C of the spring 36 for the flapper valve, and slidably support the sliding contact portions 36C at the near side. In the present embodiment, the sliding support pieces 44 are molded integrally with the valve bracket 32.

Here, as shown by the solid lines in FIG. 3, when the flapper valve 20 is at the closed-valve position TP, the point where the sliding contact portions 36C of the spring 36 for the flapper valve contact the sliding support pieces 44 of the flapper valve 20 is contact position RP-1 when valve is closed. Further, as shown by the two-dot chain lines in FIG. 3, when the flapper valve 20 is at the open-valve position HP, the point where the sliding contact portions 36C of the spring 36 for the flapper valve contact the sliding support pieces 44 of the flapper valve 20 is contact position RP-2 when valve is open.

Further, the center of the rotation shaft 22 and the contact position RS-1 when valve is closed are connected, and a reference segment RS-1 when the valve is closed is assumed. Further, the center of the rotation shaft 22 and the contact position RP-2 when valve is open are connected, and a reference segment RS-2 when the valve is open is assumed. Moreover, a bisector BS of the angle formed by the reference segment RS-1 when the valve is closed and the reference segment RS-2 when the valve is open is assumed. In the fueling portion structure 12 of the present embodiment, as can be understood from FIG. 1, the spring shafts 42 (the mounting portions 36B) are positioned further toward the side of the contact position RS-1 when valve is closed than the bisector BS (not including on the bisector BS).

When the flapper valve 20 is at the closed-valve position TP, the length from the spring shaft 42 to the contact position RS-1 when valve is closed (the length of the portion at which the spring 36 for the flapper valve substantially functions as a spring) is spring length SL-1 when valve is closed. Further, when the flapper valve 20 is at the open-valve position HP, the length from the spring shaft 42 to the contact position RS-1 when valve is closed (the length of the portion at which the spring 36 for the flapper valve substantially functions as a spring) is spring length SL-2 when valve is open.

In the present embodiment, the spring shafts 42 are positioned further toward the side of the contact position RS-1 when valve is closed than the above-described bisector BS. Accordingly, the spring length SL-2 when valve is open changes so as to gradually become longer from the spring length SL-1 when valve is closed. In other words, the length of the portion at which the spring 36 for the flapper valve substantially functions as a spring gradually increases as the flapper valve 20 rotates from the closed-valve position TP toward the open-valve position HP.

Further, in the present embodiment, with respect to force FA-1, FA-2 that is applied from the spring 36 for the flapper valve to the flapper valve 20, the component in the peripheral direction around the rotation shaft 22 of this force FA-1, , FA-2 is considered. This component is pushing force component FB-1, , FB-2 that is directed toward the closed-valve position TP with respect to the flapper valve 20.

As can be understood from FIG. 3, an angle (pushing angle $\theta 2$ when valve is open), that is formed by the force FA-2 and the pushing force component FB-2 when the flapper valve 20 is at the open-valve position HP, is greater than an angle (pushing angle $\theta 1$ when valve is closed) that is formed by the force FA-1 and the pushing force component FB-1 when the flapper valve 20 is at the closed-valve position TP.

Operation of the fueling portion structure 12 of the present embodiment is described next.

In the usual state, as shown in FIG. 1 and FIG. 2, the flapper valve 20 is at the closed-valve position TP, and the fueling port 26 is closed by the flapper valve 20. The force FA-1 is applied to the flapper valve 20 from the spring 36 for the flapper valve, and, in particular, the flapper valve 20 is reliably maintained at the closed-valve position TP by the pushing force component FB-1 of this force FA-1, . Namely, the fueling port 26 can be reliably closed by the flapper valve 20 that is at the closed-valve position TP.

When fuel is to be supplied to the fuel tank from the fueling gun 28, the flapper valve 20 is pushed by the fueling gun 28, and is rotated toward the open-valve position HP against the force applied from the spring 36 for the flapper valve.

Then, as shown in FIG. 4, in the state in which the flapper valve 20 has reached the open-valve position HP, the fueling gun 28 reaches a predetermined position for fueling the fuel tank, and the fueling gun spring 28S is anchored on the anchor portion 24. Because the fueling gun 28 is inserted at a predetermined position of the fueling port 26, it is possible to carry out fueling of the fuel tank.

As can be understood from FIG. 3, the spring length SL-2 when valve is open, at the time when the flapper valve 20 is at the open-valve position HP, is longer than the spring length SL-1 when valve is closed at the time when the flapper valve 20 is at the closed-valve position TP. Accordingly, when comparing the forces FA-1, , FA-2 that are applied to the flapper valve 20 from the spring 36 for the flapper valve, the force FA-2 when the valve is open is smaller than the force FA-1 when the valve is closed.

Further, the pushing angle $\theta 2$ when valve is open, at the time when the flapper valve 20 is at the open-valve position HP, is greater than the pushing angle $\theta 1$ when valve is closed at the time when the flapper valve 20 is at the closed-valve position TP.

Due thereto, the pushing force component FB-2 when valve is open is smaller than the pushing force component FB-1 when valve is closed.

Figure 6:
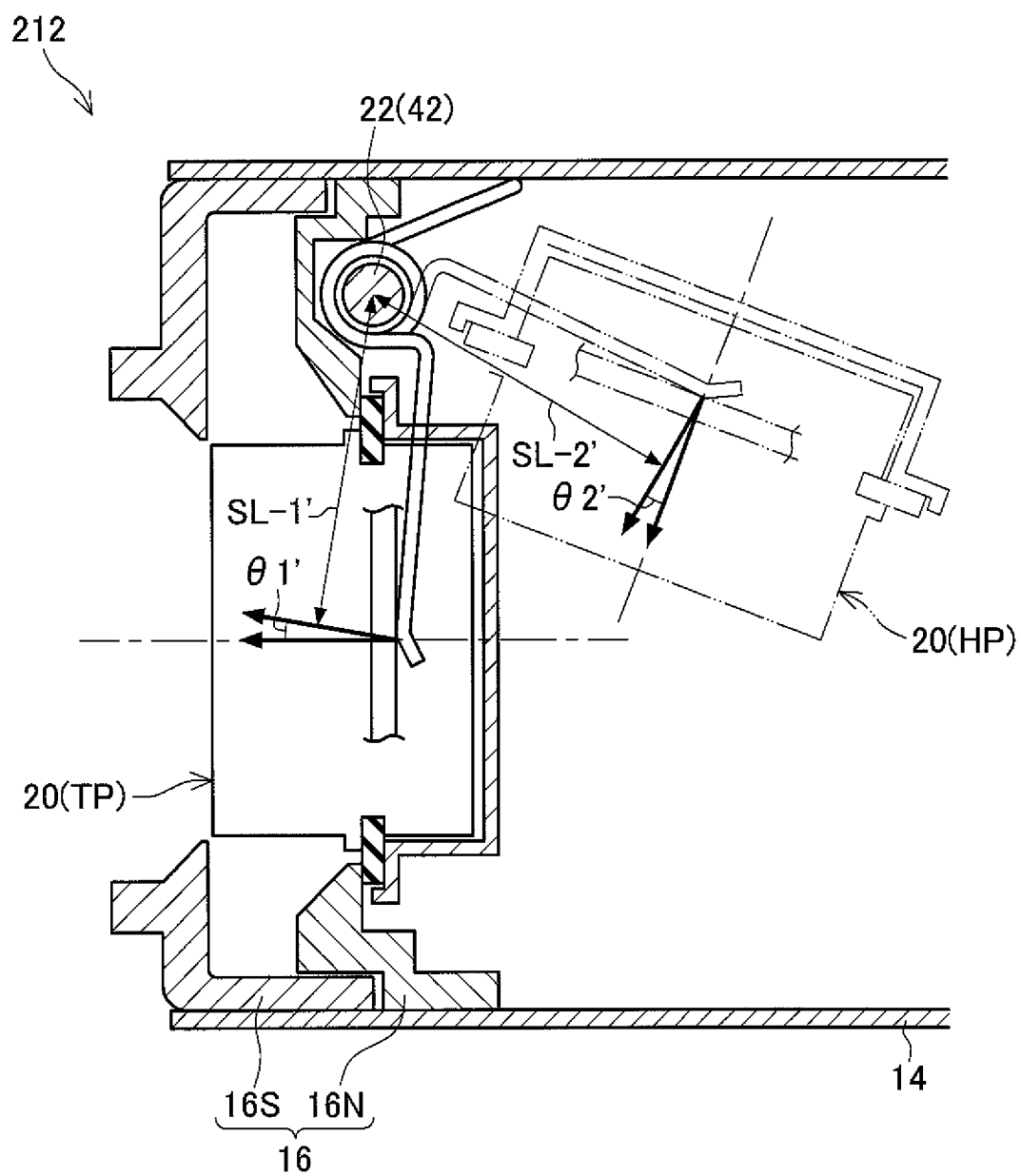
FIG. 6 is a cross-sectional view showing a fueling portion structure of a comparative example.

A fueling portion structure 212 of a comparative example is shown in FIG. 6. In the fueling portion structure 212 of the comparative example, the spring shafts 42 of the spring 36 for the flapper valve are set at the same position as the rotation shaft 22. Accordingly, spring length SL-1' when valve is closed and spring length SL-2' when valve is open are equal.

Further, in the fueling portion structure 212 of the comparative example, pushing angle θ1' when valve is closed, at the time when the flapper valve 20 is at the closed-valve position TP, and pushing angle θ2' when valve is open, at the time when the flapper valve 20 is at the open-valve position HP, are equal.

Figure 7:
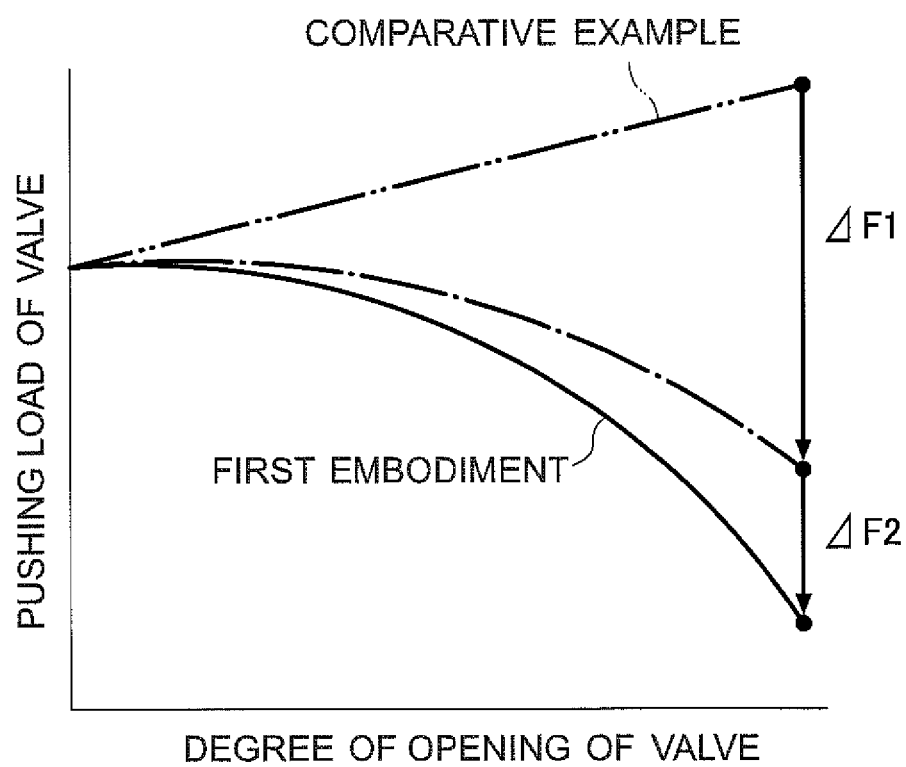
FIG. 7 is a graph qualitatively showing the relationship between degree of opening of a flapper valve and pushing load on the flapper valve from a spring for the flapper valve, in the structures of the first embodiment and the comparative example.

The relationship between the degree of opening of the flapper valve 20 (degree of opening of valve) and the pushing load that is applied to the flapper valve 20 from the spring 36 for the flapper valve (pushing load of valve), in the above-described first embodiment and the comparative example, is shown in FIG. 7. At an elastic body such as the spring 36 for the flapper valve or the like, when the amount of deformation becomes large, the elastic force that acts in the direction of cancelling that deformation also becomes large. Accordingly, in the fueling portion structure 212 of the comparative example, as shown by the two-dot chain line, as the degree of opening of the flapper valve 20 becomes larger, the pushing force that is applied from the spring 36 for the flapper valve to the flapper valve 20 also simply becomes larger.

In actuality, in the state in which the fueling gun 28 has reached a predetermined position within the fueling port 26, the fueling gun spring 28S is anchored on the anchor portion 24, and therefore, in order to pull the fueling gun 28 out from the fueling port, it is necessary to cause the fueling gun spring 28S to ride-up over the anchor portion 24 and release the anchoring. In the fueling portion structure 212 of the comparative example, when the flapper valve 20 is at the open-valve position HP, a large pushing force is applied to the flapper valve 20 from the spring 36 for the flapper valve, and therefore, a large force is needed also in order to cause the fueling gun spring 28S to ride-up over the anchor portion 24.

In contrast, in the fueling portion structure 12 of the present embodiment, as described above, the spring length SL-2 when valve is open, at the time when the flapper valve 20 is at the open-valve position HP, is longer than the spring length SL-1 when valve is closed at the time when the flapper valve 20 is at the closed-valve position TP. Accordingly, it can be understood that, due to this point, as is shown by the one-dot chain line in FIG. 7, the pushing load that is applied to the flapper valve 20 from the spring 36 for the flapper valve also is smaller than in the fueling portion structure 212 of the comparative example (the amount of reduction in load relating to this point is shown by ΔF1).

Moreover, in the present embodiment, the pushing angle θ2 when valve is open, at the time when the flapper valve 20 is at the open-valve position HP, is greater than the pushing angle θ1 when valve is closed at the time when the flapper valve 20 is at the closed-valve position TP. It can be understood that, accompanying this, as shown by the solid line in FIG. 7, the pushing load that is applied to the flapper valve 20 from the spring 36 for the flapper valve is even smaller than the case shown by the one-dot chain line (the amount of reduction in load relating to this point is shown by ΔF2).

Due to the above, in the present embodiment, it suffices for the force, that is for causing the fueling gun spring 28S to ride-up over the anchor portion 24 at the time of pulling the fueling gun 28 out from the fueling port, to be smaller than that in the comparative example. Therefore, the work for pulling the fueling gun 28 out from the fueling port 26 is easy.

Note that, in the present embodiment, a torsion spring is used as the spring 36 for the flapper valve (spring member), but the spring member of the present invention is not limited to a torsion spring. However, at the torsion spring, the portions that are wound around the spring shafts 42 deform as the flapper valve 20 rotates from the closed-valve position TP to the open-valve position HP. Accordingly, as compared with a structure that uses a plate spring or the like as the spring member, the amount of increase in the spring force is small even if the angle of opening of the flapper valve 20 becomes large. Therefore, a torsion spring as preferable as the spring member that is used in the fueling portion structure 12 of the present embodiment.

Further, the spring member may be, for example, a spring of a structure in which the portions from the mounting portions 36B to the anchor portion 36A of the spring 36 for the flapper valve are omitted, and that is directly mounted on (fixed to) the spring shafts 42 by the mounting portions 36B.

Figure 8:
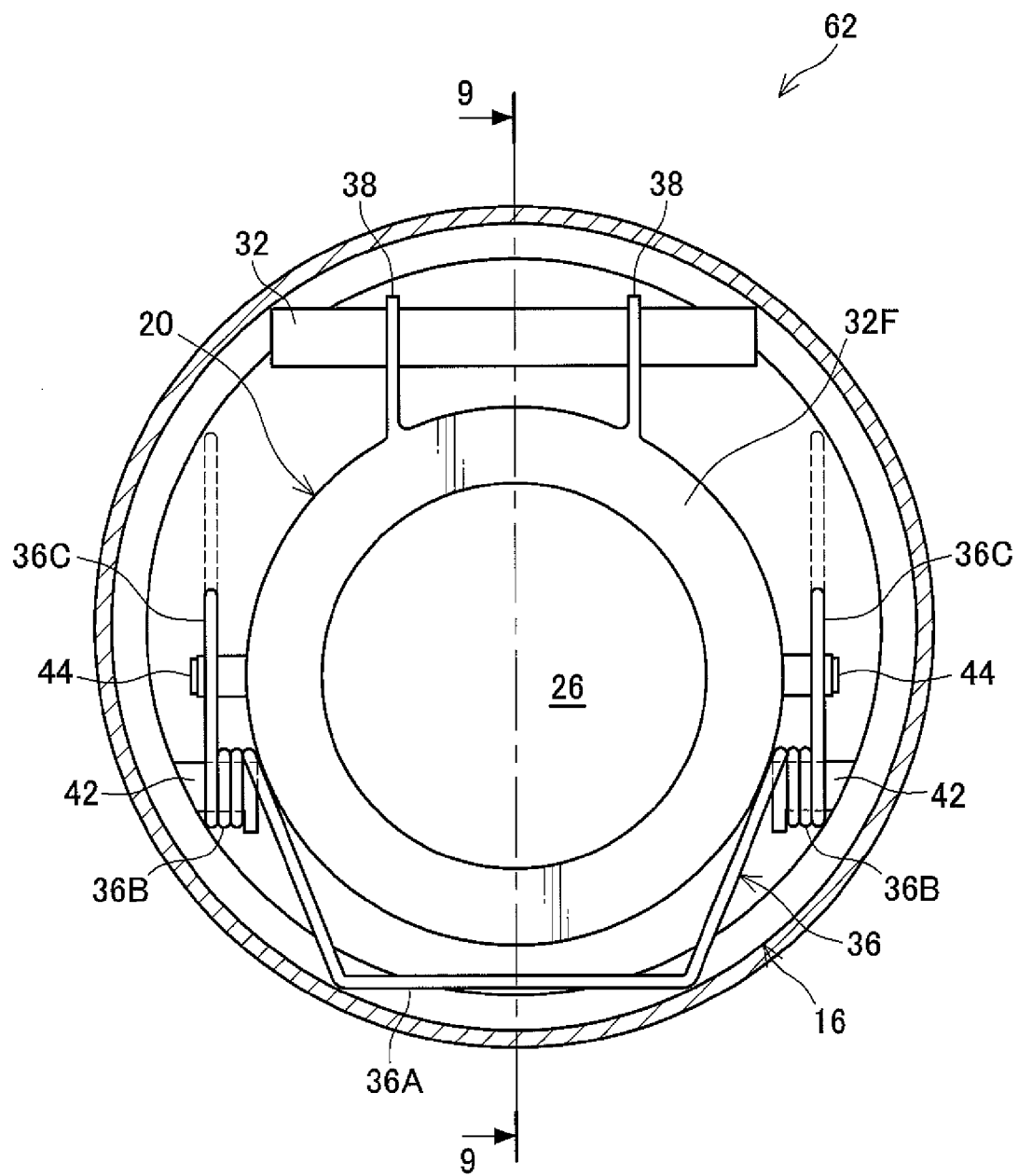
FIG. 8 is a rear view showing a fueling portion structure of a fuel tank of a second embodiment of the present invention, in a state of being viewed from the deep side of a fueling port.
Figure 9:
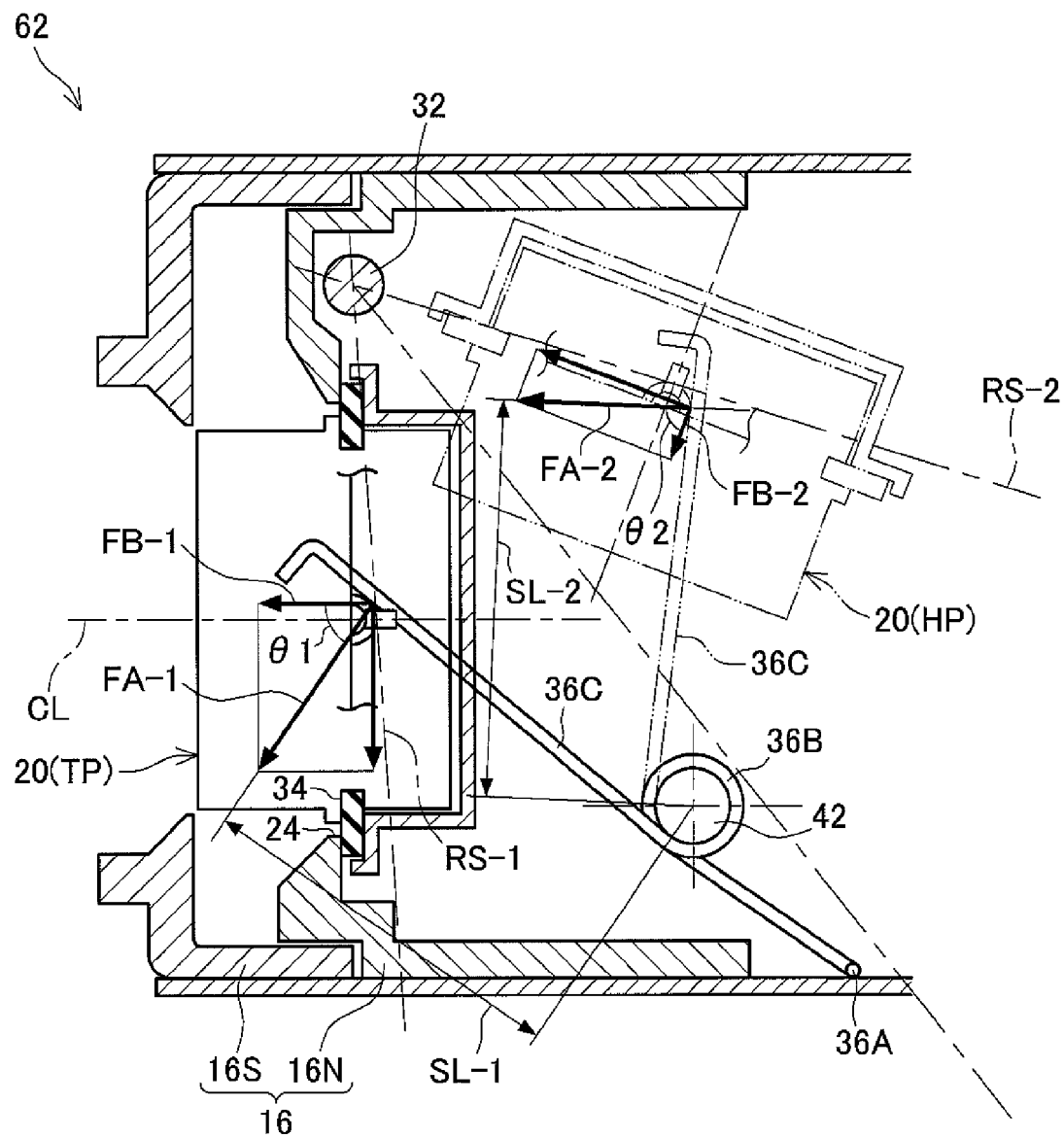
FIG. 9 is a cross-sectional view along line 3-3 of FIG. 2 showing the fueling portion structure of a fuel tank of the second embodiment of the present invention.

A fueling portion structure 62 of a second embodiment of the present invention is shown in FIG. 8 in a state of being viewed from the reverse surface. The fueling portion structure 62 is shown in FIG. 9 in a cross-sectional view along line 9-9 of FIG. 8. In the second embodiment, structural elements, members and the like that are the same as those of the first embodiment are denoted by the same reference numerals, and detailed description thereof is omitted.

In the fueling portion structure 62 of the second embodiment, the spring shafts 42 are provided at the inner housing 16N at the side opposite the rotation shaft 22 with respect to the central line CL (the lower side in FIG. 8 and FIG. 9). Further, in the same way as the fueling portion structure 12 of the first embodiment, the spring shafts 42 are positioned further toward the contact position RS-1 when valve is closed side than the bisector BS.

Accordingly, in the fueling portion structure 62 of the second embodiment as well, the spring length SL-2 when valve is open, at the time when the flapper valve 20 is at the open-valve position HP, is longer than the spring length SL-1 when valve is closed at the time when the flapper valve 20 is at the closed-valve position TP. Accordingly, the force FA-1 that is applied from the spring 36 for the flapper valve when the flapper valve 20 is open is smaller than the force FA-2 that is applied when the valve is closed.

Further, the pushing angle θ2 when valve is open, at the time when the flapper valve 20 is at the open-valve position HP, is greater than the pushing angle θ1 when valve is closed at the time when the flapper valve 20 is at the closed-valve position TP. Accordingly, the pushing force component FB-2 when valve is open is smaller than the pushing force component FB-1 when valve is closed.

Therefore, in the fueling portion structure 62 of the second embodiment as well, the pushing force, that is applied to the flapper valve 20 from the spring 36 for the flapper valve when the flapper valve 20 is at the open-valve position HP, is small, and the work of pulling the fueling gun 28 out from the fueling port 26 is easy.

Figure 10:
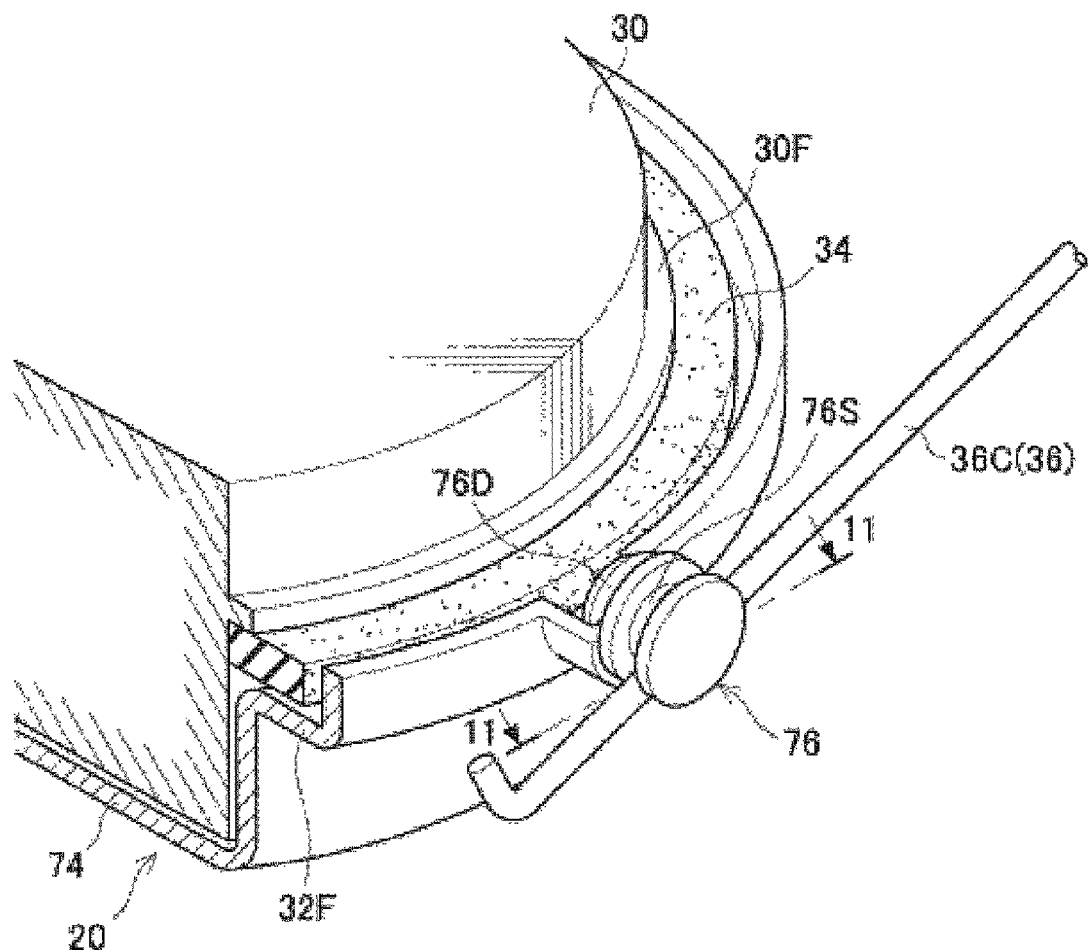
FIG. 10 is an enlarged perspective view partially showing, in a partially broken manner, a fueling portion structure of a fuel tank of a third embodiment of the present invention.

A fueling portion structure 72 of a third embodiment of the present invention is shown in FIG. 10 in a partially enlarged manner. The fueling portion structure 72 is shown in an enlarged manner in FIG. 11 in a cross-sectional view along line 11-11 of FIG. 10. In the third embodiment, the overall structure of the fueling portion structure is the same as that of the first embodiment, and therefore, description thereof is omitted, and only the points that differ from the first embodiment are described hereinafter.

In the third embodiment, a valve bracket 74 is substantially the same structure as the valve bracket 32 of the first embodiment, but sliding support pieces 76 are not molded integrally therewith, and are made to be bodies separate from the valve bracket 74. Further, bulging portions 74B, that bulge-out toward the radial direction outer side of the valve bracket 74 partially, are formed at the valve bracket 74. Moreover, fit-together recesses 74D are formed at the bulging portions 74B.

Figure 11:
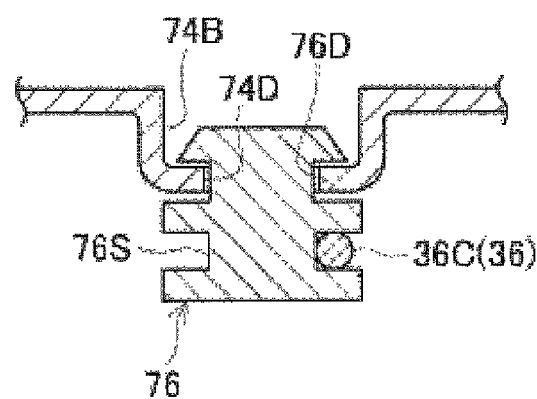
FIG. 11 is a cross-sectional view along line 11-11 of FIG. 10 showing, in a partially enlarged manner, the fueling portion structure of a fuel tank of the third embodiment of the present invention.

As shown in detail in FIG. 11 as well, the sliding support pieces 76 of the third embodiment are formed in substantially solid cylindrical shapes on the whole. A fit-together groove 76D, with which the fit-together recess 74D fits together, and a sliding support groove 76S, that slidably supports the spring 36 for the flapper valve, are formed at the sliding support piece 76. The sliding support piece 76 is fixed to the valve bracket 74 due to the fit-together recess 74D being fit-together with the fit-together groove 76D.

Accordingly, at the fueling portion structure 72 of the third embodiment as well, in the same way as the fueling portion structure 12 of the first embodiment, the sliding contact portions 36C of the spring 36 for the flapper valve slidably contact the flapper valve 20, and apply elastic force that is directed toward the closed-valve position TP.

In the third embodiment, the valve bracket 74 and the sliding support pieces 76 are made to be separate bodies, and therefore, molding of each is easy, and further, the degrees of freedom in the shape of the sliding support pieces 76 also are high.

In contrast, in the first embodiment, because the valve bracket 32 and the sliding support pieces 44 are molded integrally, there are fewer parts. Further, there are also fewer processes for manufacturing the fueling portion structure 12.

Note that, in the above explanation, an example in which the overall structure of the fueling portion structure is the same as that of the first embodiment is given as the third embodiment. However, the structure in which the valve bracket 74 and the sliding support pieces 76 are made to be separate bodies may also be applied to a fueling portion structure that has an overall structure that is the same as that of the fueling portion structure 62 of the second embodiment.

In the first through third embodiments, in order for the spring length SL-2 when valve is open, at the time when the flapper valve 20 is at the open-valve position HP, to be longer than the spring length SL-1 when valve is closed at the time when the flapper valve 20 is at the closed-valve position TP, it suffices for the spring shafts 42 (the mounting portions 36B) to be positioned further toward the contact position RS-1 when valve is closed side than the bisector BS. Accordingly, the spring shafts 42 (the mounting portions 36B) may be further toward the near side (the left side in FIG. 3) than the housing member 16. However, as can be understood from FIG. 3 and the like, if the spring shafts 42 (the mounting portions 36B) are provided further toward the fuel tank side than the end surface at the near side of the housing member 16, the spring 36 for the flapper valve does not project-out from the fueling portion structure 12.

Figure 12:
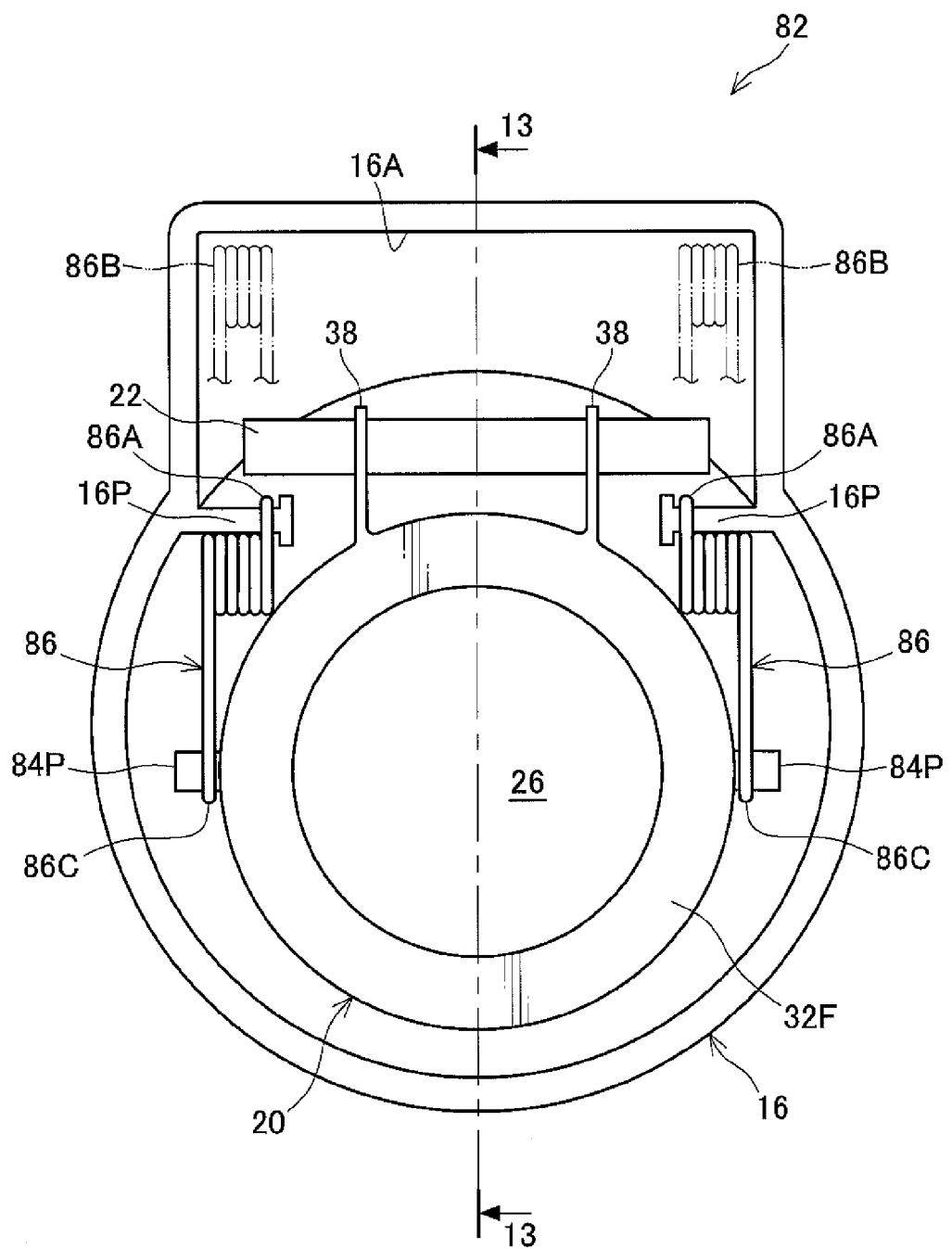
FIG. 12 is a rear view showing a fueling portion structure of a fuel tank of a fourth embodiment of the present invention, in a state of being viewed from the deep side of a fueling port.
Figure 13:
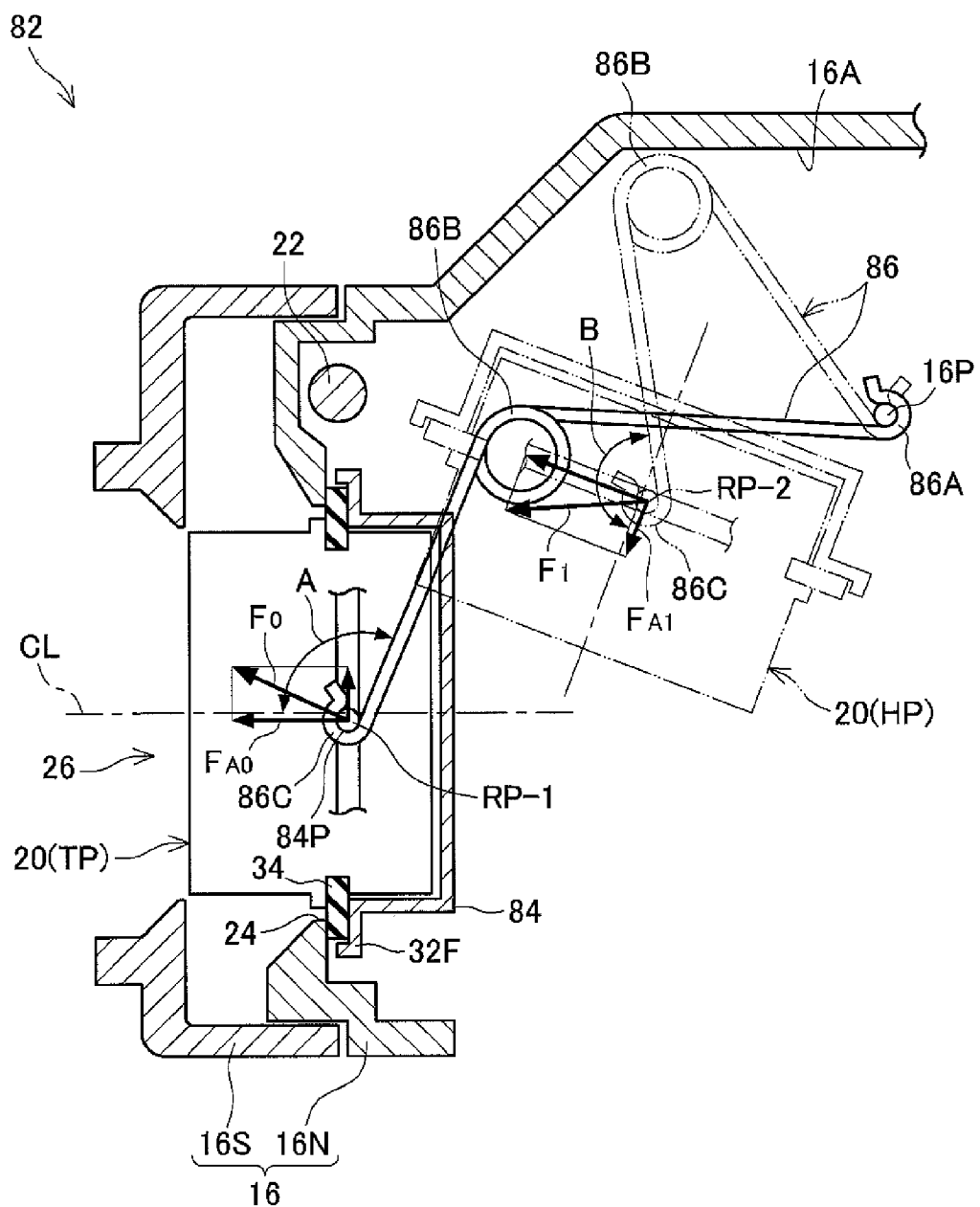
FIG. 13 is a cross-sectional view along line 13-13 of FIG. 12 showing the fueling portion structure of a fuel tank of the fourth embodiment of the present invention.

A fueling portion structure 82 of a fourth embodiment of the present invention is shown in FIG. 12. The fueling portion structure 82 is shown in FIG. 13 in a cross-sectional view along line 13-13 of FIG. 12. In the fourth embodiment as well, structural elements, members and the like that are the same as those of the first embodiment are denoted by the same reference numerals, and detailed description thereof is omitted. Note that illustration of the inlet pipe 14 is omitted in FIG. 12 and FIG. 13.

In the fueling portion structure 82 of the fourth embodiment, a pair of anchor pins 16P are formed at the inner side of the inner housing 16N. One end portions of springs 86 for the flapper valve are made to be first anchor portions 86A, and are anchored on the anchor pins 16P of the inner housing 16N.

Further, at a valve bracket 84 as well, anchor pins 84P are provided at the outer peripheral side. The other end portions of the springs 86 for the flapper valve are made to be second anchor portions 86C, and are anchored on the anchor pins 84P.

Further, in the fueling portion structure 82 of the fourth embodiment, the spring shafts 42 (refer to FIG. 2 and FIG. 3) are not provided at the inner housing 16N. Further, the intermediate portions of the springs 86 for the flapper valve are made to be bent portions 86B that are bent in spiral shapes.

As can be understood by comparing the spring 86 for the flapper valve shown by the solid lines in FIG. 13 and the spring 86 for the flapper valve shown by the two-dot chain lines, accompanying the rotating of the flapper valve 20, the positions of the anchor portion 86C and the bent portion 86B change. Accompanying this change in the positions of the anchor portion 86C and the bent portion 86B, the angle of bending of the bent portion 86B also changes. Further, the overall posture of the spring 86 for the flapper valve 86 also changes.

Note that a relief portion 16A, at which the inner housing 16N is made to have a large diameter locally, is formed so that the flapper valve 20 does not interfere with the inner housing 16N when the posture of the flapper valve 20 changes in this way.

As shown by the solid lines in FIG. 13, when the flapper valve 20 is at the closed-valve position TP, at the contact position RS-1 when valve is closed, the spring 86 for the flapper valve applies pushing force $F_0$ to the flapper valve 20. Further, a peripheral direction component $F_{A0}$ around the rotation shaft 22 is actually applied as the force that urges the flapper valve 20 to the closed-valve position TP. At this time, the angle formed by the spring 86 for the flapper valve and the peripheral direction component $F_{A0}$ is A.

Similarly, when the flapper valve 20 is at the open-valve position HP, at the contact position RP-2 when valve is open, the spring 86 for the flapper valve applies pushing force $F_1$ to the flapper valve 20. Further, a peripheral direction component $F_{A1}$ around the rotation shaft 22 is actually applied as the force that urges the flapper valve 20 to the closed-valve position TP. At this time, the angle formed by the spring 86 for the flapper valve and the peripheral direction component $F_{A1}$ is B.

In the fueling portion structure 82 of the fourth embodiment, the shape of the springs 86 for the flapper valve 86, and the positions of the first anchor portions 86A and the second anchor portions 86C, and the like are determined so that aforementioned angles A and B satisfy the conditions described below. Note that, hereinafter, angles are expressed by degree measure.

First, the bending angle of the spring 86 for the flapper valve when the flapper valve 20 is at the closed-valve position TP is made to be a, and the bending angle of the spring 86 for the flapper valve when the flapper valve 20 is at the open-valve position HP is made to be β. An amount of change θ of the bending angles of the flapper valve 20 is θ=α−β.

At the flapper valve 20, considering that the spring force increases in proportion to the amount of increase in the bending angle at least when the bending angle is within the range of α to β, given that the spring constant of the flapper valve 20 is k, $$F1 = k\theta + F_0 \quad (1)$$

is established.

Further, from FIG. 13, $$F_{A1} = F_1 \cdot \sin(180 - B) \quad (2)$$

$$F_{A0} = F_0 \cdot \sin(180-A) \quad (3).$$

In the fourth embodiment as well, if the peripheral direction component $F_{A1}$ of the pushing force at the time when the flapper valve 20 is at the open-valve position HP is made to be smaller than the peripheral direction component $F_{A0}$ of the pushing force at the time when the flapper valve 20 is at the closed-valve position TP, pulling-out of the fueling gun 28 that is inserted in the fueling port 26 is easy. Namely, it suffices to satisfy the condition $F_{A1} < F_{A0}$.

From (2) and (3), this condition can be modified to $$F_1 \cdot \sin(180-B) < F_0 \cdot \sin(180-A).$$

Further, from (1), $$(k\theta + F_0) \cdot \sin(180-B) < F_0 \cdot \sin(180-A).$$

Here, from the properties of the trigonometric function, $$(k\theta + F_0) \cdot \sin(B) < F_0 \cdot \sin(A) \quad (4)$$

is derived. Namely, the formed angles A and B are set such that the relationship of (4) is satisfied.

In this way, in the fueling portion structure 82 of the fourth embodiment, with regard to the pushing force that is applied to the flapper valve 20 from the spring 86 for the flapper valve, the relationship $F_{A1} < F_{A0}$ is satisfied. Accordingly, in the fueling portion structure 82 of the fourth embodiment as well, when the flapper valve 20 is at the open-valve position HP, the pushing force that is applied to the flapper valve 20 from the spring 36 for the flapper valve is small, and the work of pulling the fueling gun 28 out from the fueling port 26 is easy.

Reference examples of the present invention are described next. In the structures of the reference example as well, the effects are achieved that the fueling port can be reliably closed by the flapper valve, and pulling-out of a fueling gun from the fueling port is made easy.

Note that, in the following respective reference examples as well, structural elements, members and the like that are the same as those of the first embodiment are denoted by the same reference numerals, and detailed description thereof is omitted.

Figure 14:
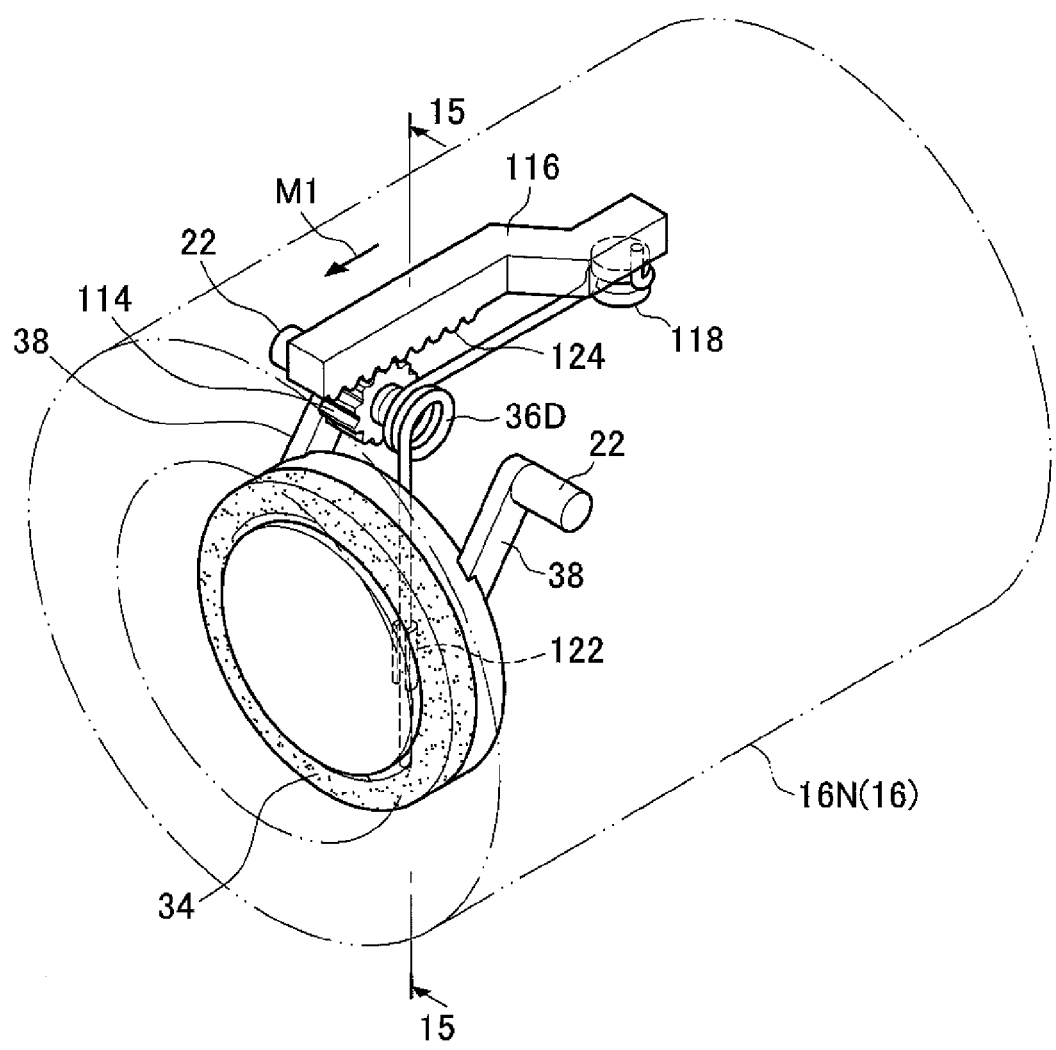
FIG. 14 is a schematic perspective view showing a fueling portion structure of a fuel tank of a first reference example.
Figure 15:
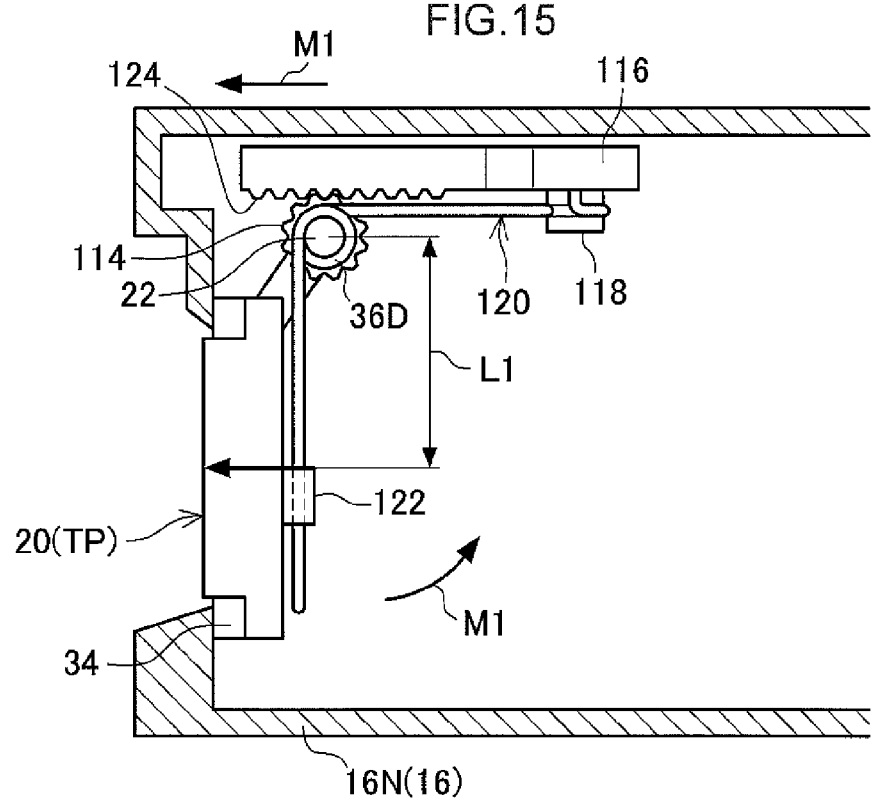
FIG. 15 is a cross-sectional view along line 15-15 of FIG. 14 showing the fueling portion structure of a fuel tank of the first reference example.

The schematic structure of a fueling portion structure 112 of a first reference example is shown in a perspective view in FIG. 14. The fueling portion structure 112 is shown in FIG. 15 in a cross-sectional view along line 15-15 of FIG. 14. Note that, in the first reference example, illustration of the outer housing is omitted.

In the fueling portion structure 112 of the first reference example, a pinion 114 is fixed to the rotation shaft 22. When the flapper valve 20 rotates around the rotation shaft 22, the pinion 114 also rotates integrally.

A slider 116, that can slide in the axial direction of the housing member 16 (the arrow M1 direction and the direction opposite thereto), is provided within the inner housing 16N. A rack 124 that meshes-together with the pinion 114 is formed at the slider 116. Accordingly, due to the flapper valve 20 rotating in the arrow R1 direction, the slider 116 slides in the arrow M1 direction and the direction opposite thereto. Concretely, when the flapper valve 20 rotates from the closed-valve position TP to the open-valve position HP, the slider 116 slides toward the near side (in the arrow M1 direction) at the fueling port 26.

A fixing piece 118 is provided at the slider 116. One end side of a spring 120 for the flapper valve is fixed to the fixing piece 118.

A sliding support piece 122 is provided at the flapper valve 20. The other end side of the spring 120 for the flapper valve is slidably supported at the sliding support piece 122. Accordingly, the distance from a coil portion 120D at the middle of the spring 120 for the flapper valve to the sliding support piece 122 is the length of the portion at which the spring 120 for the flapper valve applies pushing force to the flapper valve 20.

In the fueling portion structure 112 of the first reference example that has such a structure, when the flapper valve 20 is at the closed-valve position TP, the length of the portion at which the spring 120 for the flapper valve applies pushing force to the flapper valve 20 is L1 as shown in FIG. 15.

Figure 16:
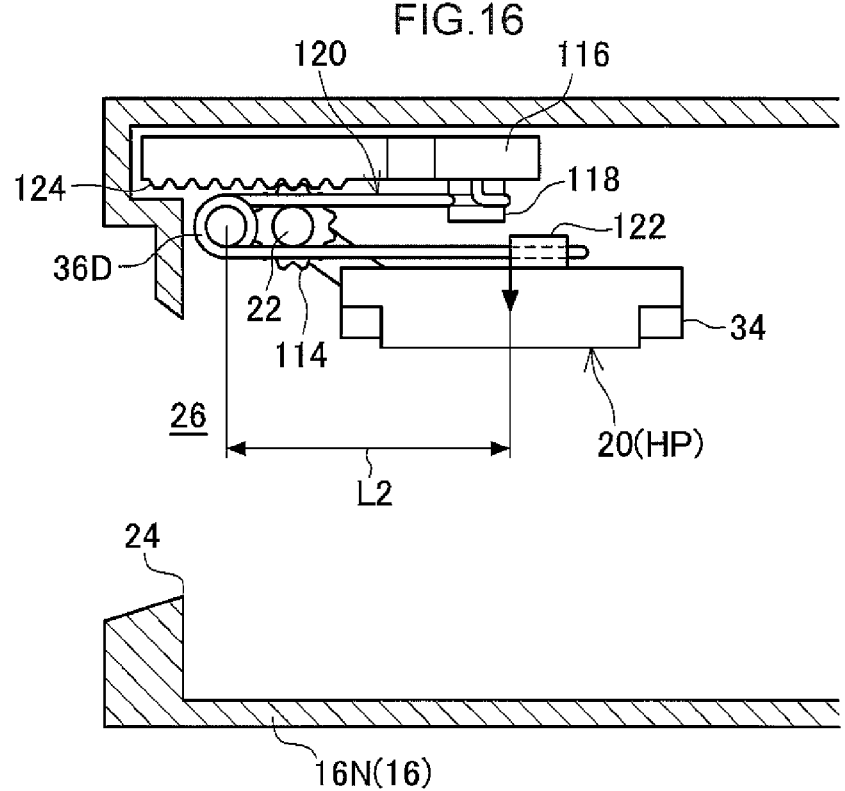
FIG. 16 is a cross-sectional view showing the fueling portion structure of a fuel tank of the first reference example in a state in which a flapper valve is at an open-valve position.

In contrast, in the state in which the fueling gun 28 is inserted in the fueling port 26, as shown in FIG. 16, the slider 116 and the spring 120 for the flapper valve slide in the arrow M1 direction, and the length of the portion at which the spring 120 for the flapper valve applies pushing force to the flapper valve 20 becomes L2. Further, the relationship L1<L2 is established.

Accordingly, the relationship a1>a2 is established between pushing force a2 from the spring 120 for the flapper valve at the time when the flapper valve 20 is at the open-valve position HP, and pushing force a2 from the spring 120 for the flapper valve at the time when the flapper valve 20 is at the closed-valve position TP. Due thereto, in the fueling portion structure 112 of the first modified example as well, when the flapper valve 20 is at the open-valve position HP, the pushing force that is applied to the flapper valve 20 from the spring 120 for the flapper valve is small, and the work of pulling the fueling gun 28 out from the fueling port 26 is easy.

Figure 17:
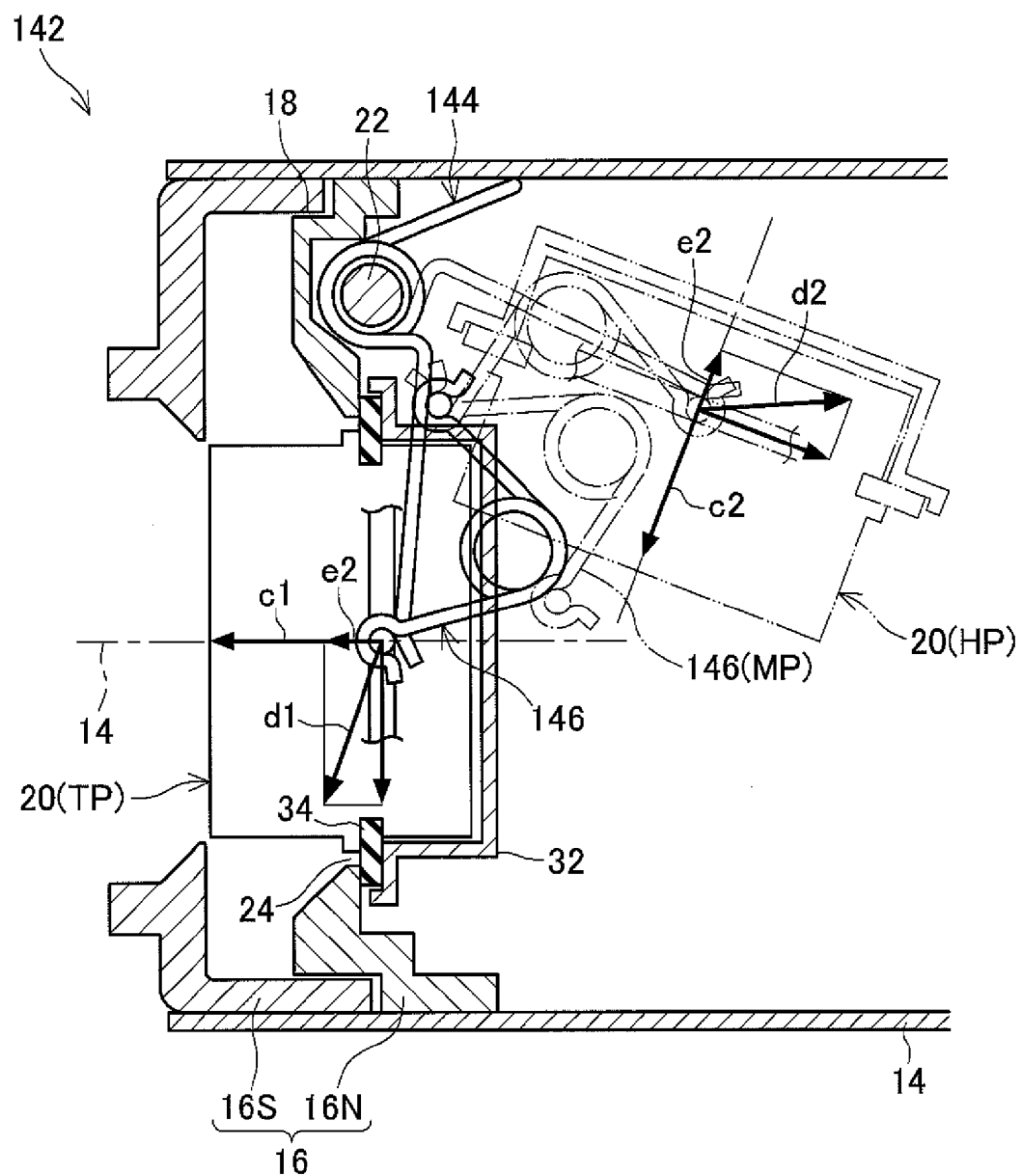
FIG. 17 is a cross-sectional view showing a fueling portion structure of a fuel tank of a second reference example.

A fueling portion structure 142 of a second reference example is shown in FIG. 17. The fueling portion structure 142 of the second reference example is provided with an auxiliary spring 146 for the flapper valve, in addition to a spring 144 for the flapper valve.

One end side of the spring 144 for the flapper valve is anchored on the inner peripheral surface of the inlet pipe 14, and the other end side is anchored on the flapper valve 20. Further, when the flapper valve 20 is at the closed-valve position TP, the spring 144 for the flapper valve applies pushing force c1 in the peripheral direction around the rotation shaft 22. Further, when the flapper valve 20 is at the open-valve position HP, the spring 144 for the flapper valve applies pushing force c2 in the peripheral direction around the rotation shaft 22. The pushing force, that is applied to the flapper valve 20 from the spring 144 for the flapper valve, is applied toward the closed-valve position TP regardless of the position of the flapper valve 20.

In contrast, one end side of the auxiliary spring 146 for the flapper valve is anchored on the inner housing 16N, and the other end side is anchored on the flapper valve 20 at the same position as the other end side of the spring 144 for the flapper valve. Further, when the flapper valve 20 is at the closed-valve position TP, the auxiliary spring 146 for the flapper valve applies force d1 to the flapper valve 20. A peripheral direction component around the rotation shaft 22 of this force d1 is in the direction of urging the flapper valve 20 to the closed-valve position TP (the same direction as the pushing force e1 from the spring 144 for the flapper valve). Namely, the peripheral direction component of the force d1 is applied to the flapper valve 20 as pushing force e1 toward the closed-valve position TP. Note that the spring force of the auxiliary spring 146 for the flapper valve is set so that e1<c1 is satisfied.

In contrast, when the flapper valve 20 is at the open-valve position HP, force e2, that the auxiliary spring 146 for the flapper valve applies to the flapper valve 20, is set to be such that the peripheral direction component of this force e2 is in the direction of urging the flapper valve 20 to the open-valve position (the direction opposite the pushing force c2 from the spring 144 for the flapper valve).

Concretely, the auxiliary spring 146 for the flapper valve is made to be a shape such that, when the flapper valve 20 is at a midway position MP (refer to the one-dot chain lines) when rotating from the closed-valve position TP toward the open-valve position HP, the peripheral direction component of the force that the auxiliary spring 146 for the flapper valve applies to the flapper valve 20 changes so as to become a direction heading toward a releasing position.

Accordingly, when the flapper valve 20 is at the open-valve position HP, the force in the peripheral direction that is applied to the flapper valve 20 is c2–e2, with the direction heading from the open-valve position HP toward the closed-valve position TP being positive. Due thereto, in the fueling portion structure 112 of the second modified example as well, when the flapper valve 20 is at the open-valve position HP, the pushing force that is applied to the flapper valve 20 from the spring 120 for the flapper valve is small, and the work of pulling the fueling gun 28 out from the fueling port is easy.

The invention claimed is:

1. A fueling portion structure of a fuel tank, comprising:
    a fueling port member having a fueling port into which a fueling gun for fueling a fuel tank is inserted;
    an opening/closing valve that can open and close the fueling port;
    a rotation shaft for mounting, to the fueling port member, the opening/closing valve rotatably between a closed-valve position, at which the opening/closing valve closes the fueling port, and an open-valve position, at which the opening/closing valve is pushed by the fueling gun and opens the fueling port; and
    a spring member that is mounted to the fueling port member and slidably contacts the opening/closing valve and urges the opening/closing valve toward the closed-valve position, the spring member being mounted to the fueling port member at a position that is set further toward a side of a contact position when the opening/closing valve is closed than a bisector of an angle that is formed by a first reference segment that, when the opening/closing valve is closed, connects the rotation shaft and the contact position when the opening/closing valve is closed at which the spring member contacts the opening/closing valve at the closed-valve position, and a second reference segment that, when the opening/closing valve is open, connects the rotation shaft and a contact position when the opening/closing valve is open at which the spring member contacts the opening/closing valve at the open-valve position,
    wherein:
        the fueling port member comprises a spring shaft that is formed parallel to the rotation shaft and at a different position from the rotation shaft; and
        the spring member is a torsion spring comprising:
            a mounting portion that is wound around and mounted to the spring shaft; and
            a sliding contact portion that extends from the mounting portion and slidably contacts the opening/closing valve.

2. The fueling portion structure of a fuel tank of claim 1, further comprising a supporting member that is provided at the opening/closing valve and that contacts and slidably supports the sliding contact portion of the spring member.

3. A fueling portion structure of a fuel tank, comprising:
    a fueling port member having a fueling port into which a fueling gun for fueling a fuel tank is inserted;
    an opening/closing valve that can open and close the fueling port;
    a rotation shaft for mounting, to the fueling port member, the opening/closing valve rotatably between a closed-valve position, at which the opening/closing valve closes the fueling port, and an open-valve position, at which the opening/closing valve is pushed by the fueling gun and opens the fueling port; and
    a spring member that is mounted to the fueling port member, contacts the opening/closing valve and urges the opening/closing valve toward the closed-valve position, the posture of the spring member changing such that a valve-closing direction component of urging force, which the spring member applies to the opening/closing valve at the open-valve position, is smaller than a valve-closing direction component of urging force that the spring member applies to the opening/closing valve at the closed-valve position,
    wherein the spring member comprises:
    a first anchor portion that is anchored on the fueling port member;
    a second anchor portion that is anchored on the opening/closing valve; and
    a bent portion that is formed by being bent between the first anchor portion and the second anchor portion, and whose position and bending angle can change in order to effect the change in posture.

* * * * *